Figure 1:
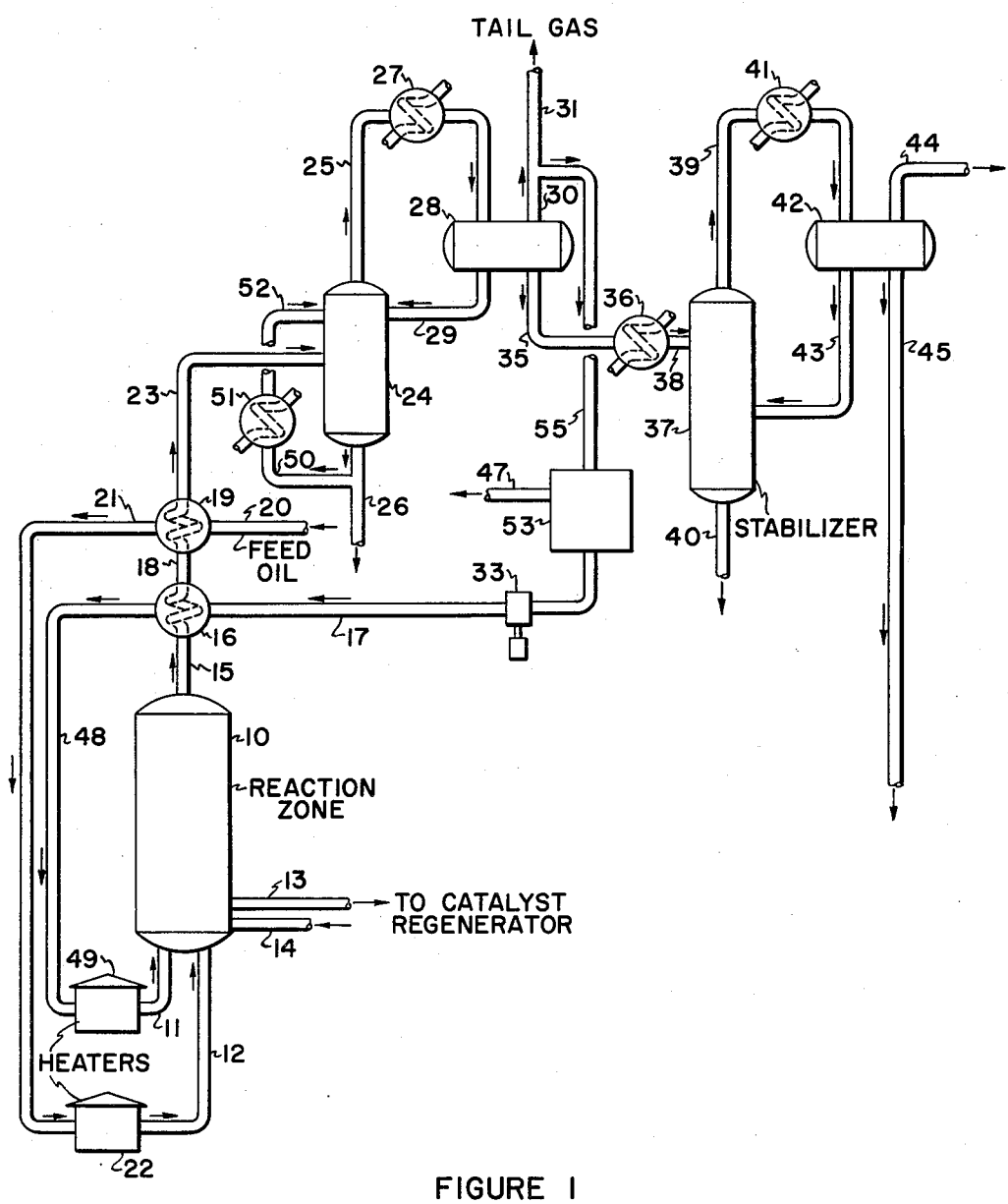

Charles W. Skarstrom  Inventor

Charles W. Skarstrom    Inventor
By W. V. ?
                                    Patent Attorney Charles W. Skarstrom  Inventor United States Patent Office 3,101,261
Patented Aug. 20, 1963

3,101,261
PROCESS FOR THE RECOVERY OF HYDROGEN FROM HYDROCARBON GAS STREAMS
Charles W. Skarstrom, Montvale, N.J., assignor to Esso Research and Engineering Company, a corporation of Delaware
Filed Apr. 12, 1960, Ser. No. 21,702
15 Claims. (Cl. 55—58)

The present invention is concerned with the recovery of hydrogen from hydrocarbon gas streams containing the same. In its broadest scope the invention is concerned with an improved method and apparatus for fractioning gaseous mixtures comprising hydrogen. The invention comprises a continuation in part and an improvement and adaptation of the process and apparatus described in copending application Serial No. 714,780, filed February 12, 1958, now U.S. Patent No. 2,880,103, entitled "Method and Apparatus for Fractionating Gaseous Mixtures," inventor Charles W. Skarstrom. The improvements with respect to the apparatus and process described in application Serial No. 714,780 comprise both processing principles and apparatus features. For example, the actual backwash volume must exceed slightly the actual feed volume per cycle for complete purity of the least adsorbed component. Apparatus improvements comprise the use of a surge tank, the repressuring of the beds from the product end and other improvements. In a particular specific adaptation of the present invention the apparatus described in the identified application is utilized in a hydroforming process in order to improve the hydroforming operation.

In essence the specific adaptation of the present invention comprises a process wherein the tail gases recycled to the reaction zone are pressure cycled, wherein in one zone the hydrogen is purified at a relatively high pressure while the desorption zone is backwashed with a portion of the hydrogen product at a relatively low pressure.

Catalytic reforming has assumed increasing importance in petroleum refining as a result of the desire to upgrade the octane number of petroleum hydrocarbons. There are many catalytic reforming processes known in the art. Basically they may be divided into those employing a precious metal catalyst, as for example, platinum on alumina or other suitable base, or non-precious metal catalysts, such as, molybdena, cobaltmolybdena, and the like. In general, any hydrocarbon boiling in the range of about 100 to 430° F. may be reformed at a reaction temperature range of about 800 to 1000° F. The reforming process is actually a combination of several types of chemical reactions, such as, aromatization, dehydrogenation of naphthenes, isomerization, and the like. The most desired reaction product is the $C_5+$ fraction which is readily employed as a high octane gasoline component.

More specifically, hydroforming is a process in which the normally liquid feed stock boils substantially within the range of from about 150° to 430° F. and more particularly 180° to 350° F. The light ends, i.e., the material boiling from 0° to 180° F., are not ordinarily subjected to this reaction, for the reason that the virgin naphtha light ends are not appreciably upgraded by conventional reforming treatments. The feed or charging stock to the hydroforming reactor can be a virgin naphtha, a cracked naphtha, a coker naphtha, a Fischer-Tropsch naphtha, a mixture of these, or the like.

Hydroforming operations are ordinarily carried out in the presence of hydrogen or hydrogen-rich recycle gas at temperatures of 750° to 1150° F. in a pressure range of about 50 to 1000 pounds per square inch, and in contact with solid catalysts.

As mentioned, the chemical reactions involved in the hydroforming process include dehydrogenation of naphthenes to the corresponding aromatics, isomerization of straight chain paraffins to form branched chain paraffins, isomerization of cyclic compounds, such as, ethylcyclopentane, to form methylcyclohexane, and some aromatization of paraffins, dealkylation and hydrocracking of paraffins. In a hydroforming operation which is conducted efficiently it is possible with the use of a proper catalyst and proper conditions of operation to hydroform a virgin naphtha to a hydroformate, for example, having Research clear octane number of from 95 to 98 and obtain yields of $C_5+$ hydrocarbons as high as 80%.

Catalysts used in hydroforming are platinum, palladium, molybdenum oxide, chromium oxide, cobalt molybdate or, in general, oxides or sulfides of metals of groups IV–VIII of the periodic system of elements or mixtures of these elements supported or dispersed upon a base or spacing element, such as, alumina gel, precipitated alumina, or zinc aluminate spinel.

A particularly useful catalyst for hydroforming operations is .001–2.0 weight percent platinum upon an alumina spacing agent or base.

In hydroforming operations hydrogen containing recycle and make gas is recycled with the feed in order to minimize coke deposition and to supply heat for the hydroforming reaction. When, as is conventionally done, platinum catalyst is extensively chlorine treated during the reactivation process, chlorine is subsequently stripped off the catalyst in the hydroforming process and is recycled with the recycle gas. Or where chlorides come in with the feed, they build up on the catalyst and are subsequently stripped off the catalyst and build up in the recycle gas.

A typical fluid hydroforming process is illustrated in FIGURE 1. Turning to FIGURE 1, shown therein for the purposes of illustration is a fluid hydroforming reaction system, although as previously noted the present invention is not limited thereto. The hydroforming reaction is carried out in zone 10 in the presence of hydrogen-rich recycle gas and a standard hydroforming catalyst such as molybdenum oxide upon an alumina support, or in general oxides or sulfides of groups IV, V, VI, VII and VIII of the periodic table based on a suitable support.

The catalyst is maintained in the form of a fluidized bed at a temperature of 750–1150° F., e.g., 950° F., and a pressure of 150 to 600 p.s.i.g., e.g., 200 p.s.i.g. Requisite temperature level is maintained by preheating the feed, circulating hot catalyst and employing heated recycle gas.

As is conventional in fluid hydroforming, a portion of the catalyst may be withdrawn by line 13, regenerated in a regenerator in the presence of oxygen, and returned to reaction zone 10 by line 14 at a temperature of 1050 to 1150° F. The feed, a virgin naphtha boiling between 100 to 430° F., is introduced into the system by line 20, preferably thereafter being heat exchanged with the reaction products in heat exchanger 19. The preheated oil is then passed by line 21 to heater 22 wherein it is vaporized, the vaporized charge being introduced into the reaction zone by line 12 at a temperature of 950° F.

Concurrently, a hydrogen-rich recycle gas derived in the manner described below is heated in heater 49 to a temperature of about 1200° F. and injected into the reaction zone through inlet 11.

The feed hydrocarbons upon contact with the turbulent catalyst mass are converted principally into reaction products of essentially the same boiling point as the feed stock, together with a substantial proportion of hydrogen. The reaction products may be subjected to solid de-entrainment by means not shown prior to being withdrawn overhead by line 15. They preferably are cooled in heat exchangers 16 and 19, connected by line 18, by giving up their heat to the recycle gas and feed oil, respectively. The products are then passed by line 23 to scrubber 24 wherein a relatively cool heavy oil introduced by line 52 passes countercurrently downwards to the gasiform products, condensing heavy ends which may be rejected by outlet 26. The scrubbing medium is preferably derived from the heavy reaction products, the heavy oil being recycled by line 50 through cooler 51 and back to the scrubbing zone.

The uncondensed material is withdrawn by line 25, further cooled in unit 27 and passed into separation drum 28. Sufficient cooling is effected in cooler 27 so that separator 28 normally operates at temperatures below 120° F., e.g., 105° F. at 185 p.s.i.g. The vast majority of the hydrocarbons are thus condensed. A portion thereof may be recycled to unit 24 by line 29, while the remainder of the condensed hydrocarbon products are passed to stabilizer 37 by the lines 35 and 38 after being heated in unit 36 to a temperature of 100 to 300° F.

The uncondensed reaction effluent, termed tail gas, is withdrawn from separator 28 through outlet 30. The tail gas comprises principally hydrogen, e.g. 72.5 volume percent, along with minor amounts of light hydrocarbons principally in the $C_1$ to $C_4$ range. The $C_1$ to $C_4$ hydrocarbons normally will comprise less than 50 volume percent of the tail gas. It is desirable to have as little as possible $C_5+$ in the recycled tail gas. The temperature of the tail gas may be about 150° F. to 250° F. or as low as 50° F.

A portion of the tail gas may be withdrawn from the system by line 31, while the remainder of the tail gas is employed as recycle gas. The recycle gas fraction is passed by line 32 to compressor 33 wherein its pressure is brought up to about 50 to 100 pounds above reaction pressure.

The bulk of the hydrocarbon products is fed to stabilizer 37 wherein they may be subjected to rectification to separate the various product fractions. Thus, the $C_5+$ hydrocarbon, the most valuable product, may be recovered by line 40 for use as high octane gasoline, while the lighter hydrocarbons are taken overhead by line 39, cooled in cooler 41 and separated in unit 42 into a $C_2$ and lighter fraction and a condensed $C_3$ to $C_4$ fraction. A portion of the condensed hydrocarbons may be recycled to stabilizer 37 by line 43, while the $C_2$ and lighter fraction is withdrawn by outlet 44. The $C_3/C_4$ fraction removed by line 45 may be partially recovered through line 46.

In accordance with the specific adaptation of the present invention the recycle tail gas removed by means of line 32 is passed through zone 53 by means of lines 55 and 17, which in essence comprises the apparatus and method described in copending application Serial No. 714,780. This particular apparatus utilized will be more specifically hereinafter described. In essence, the operation comprises the preparation of a substantially pure hydrogen stream or a more rich hydrogen stream which is passed to compressor 33. Non-hydrogen constituents are removed by means of line 47 and may be further treated or disposed of as desired. It is also within the concept of the present invention to position zone 53, intermediate compressor 33, and the reaction zone 10.

Figure 2:
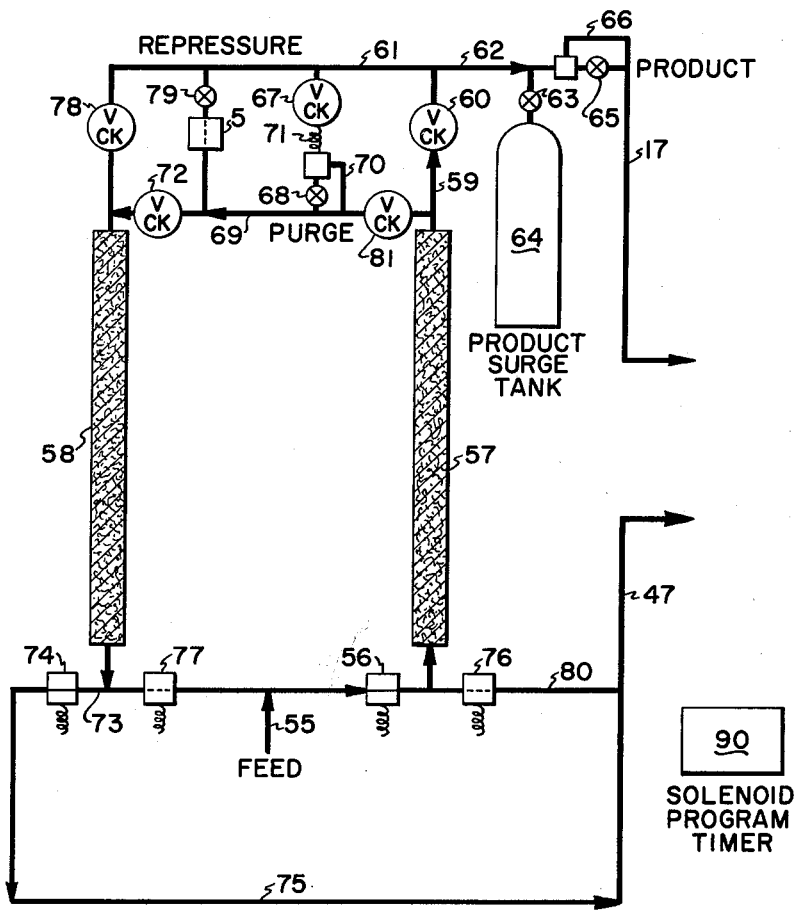

One specific method of operating zone 53 as shown on FIGURE 1 is illustrated in detail in FIGURE 2. Referring specifically to FIGURE 2, the feed or tail gas is introduced into zone 53 by means of line 55. This feed passes through an open solenoid operated valve 56 and is then introduced into the bottom of zone 57. Both zones 57 and 58 are packed with activated carbon. Substantially pure hydrogen is removed from the top of zone 57 by means of line 59. The hydrogen flows through check valve 60 and can't pass through valve 81. The hydrogen then is divided. A portion of the same passes through line 61 while the remainder passes through line 62. A portion of the hydrogen passing through line 62 passes through valve 63 and is introduced into a product surge tank 64. The remainder of the hydrogen in line 62 passes through a rate of flow valve 65, the rate of which is adjusted by a flow controller 66 which maintains predetermined pressure differential across the valve. Product hydrogen is passed by means of line 17 to the reaction zone as hereinbefore described with respect to FIGURE 1.

That portion of the hydrogen removed by means of line 61 is passed through check valve 67, through rate of flow valve 68 and then into line 69. The rate of flow through valve 68 is maintained at the desired rate of flow con-controller 70 which maintains the desired pressure drop across valve 68. In addition, valve 67 is spring loaded by means of spring 71 so as to only open after predetermined pressure drop occurs across valve 67.

The hydrogen removed through line 69 passes through check valve 72 and into the top of zone 58 where it backwashes downwardly through the bed. Bed 58 is maintained at a predetermined pressure below the pressure existing in adsorption zone 57. The hydrogen together with adsorbed constituents is removed from the bottom of zone 58 through line 73. This stream passes through solenoid operated valve 74 through line 75 and is withdrawn from the system by means of line 47 and further processed or handled as desired. Thus, when zone 57 is on adsorption and zone 58 on desorption valves 56, 74, 67, 68, 63, and 65 are open, whereas valves 76, 77, 78 and 79 are closed. At the end of the cycle when valve 74 closes, valve 79 opens until zone 58 reaches the predetermined high pressure. At this point valve 77 opens and valve 56 closes.

The cycle is then continued as hereinbefore described wherein zone 58 is on adsorption and zone 57 is on desorption. A portion of the product hydrogen flowing through valve 78 is used to backwash zone 57, a portion is used to repressure surge tank 64 and the remainder is passed through line 17 as product hydrogen. The hydrogen and desorbed components from zone 57 are passed through open valve 76, through line 80, and are withdrawn from the system through line 47.

In essence, the apparatus described in FIGURE 2 comprises two adsorbent beds which are alternately connected to the high pressure feed. While one bed is at high pressure the other bed is dumped to the low pressure, backwashed with some of the high purity product $H_2$ through a flow control valve and brought back up to line pressure with pure $H_2$ product at the product end. Five 2-way electric solenoid valves are used. These on-off valves are operated from a multicam recycling electric timer 90 (wiring not shown). The use of two on-off feed and two on-off dump valves allows the low pressure bed to be repressured before the other bed is dumped. This insures continuity in the product pressure and flow.

With respect to FIGURE 2 it has also been found that the repressuring downward with the pure product gas has two desirable features; namely, mechanical and process, as follows. (1) Mechanical: Inrushing gases from above tend to keep the spring loaded bed of particles well packed. This makes movement with consequent attrition of the particles negligible. (2) Process improvement: Repressuring with pure product gas instead of feed eliminates the very fast inflow of feed. When repressuring with feed, the high space velocity of the incoming gas causes the fronts of the adsorbing components to be moved an excessive amount toward the product end. By recharging with product from the other bed which is at high pressure, the increased feed space velocity to provide this extra demand for $H_2$ is kept at a minimum. It is further minimized by a product surge tank, hereinafter described.

To accomplish repressuring with the product, an on-off electric solenoid valve 5 is installed to by-pass the purge flow control 68. The program timer is adjusted so that the instant a dump valve 74 closes on the low pressure bed 58, etc., the repressuring valve 5 opens. This allows pure product to fill that bed to the full line pressure. A throttling valve 79 allows the rate of repressuring to be adjusted as desired. After the bed has reached full line pressure, its feed valve 77 is opened. Simultaneously, the feed valve 56 to the spent bed is shut. Finally, both the dump valve 76 to the spent bed opens and the repressuring valve 5 shuts off. The spent bed dumps to the low pressure and its purge with pure product via valve 81 commences.

Another desirable feature of the apparatus and process of FIGURE 2 is the spring loaded check 71 in the purge line. In order to derive the maximum benefit of the pure product used as purge, the purge flow is delayed until the spent bed has nearly reached its lowest pressure. The purge flow then begins. The purge is thus used at maximum expanded volume. This is accomplished by use of a spring loaded check valve 67 (relief valve) ahead of the purge flow controller 68. In one operation to make pure $H_2$, the spring loaded check was set to blow by at 130 p.s.i. differential pressure. Full line feed pressure was 155 p.s.i.g. Thus, the purge flow was delayed until the pressure in the spent bed had blown down to 155–130 equal to 25 p.s.i.g. The operation was very satisfactory.

Another desirable feature of the apparatus and process of FIGURE 2 is the product surge tank 64. A surge tank used in the pure $H_2$ product line markedly increased the $H_2$ recovered from the feed. Without the tank, $H_2$ recovery from a 50–50 $H_2$—$CH_4$ mixture was 59%. With it the recovery increased to 70%. The volume of the surge tank was about five times the volume of one bed. Its main function is to spread the demand for recharge product $H_2$ over the full adsorption cycle. This reduces the feed space velocity through the on stream bed during the repressuring. The product surge tank markedly improves the separating efficiency of this process to make pure $H_2$ from $H_2$-hydrocarbon mixtures.

Thus with respect to the process as described in FIGURE 2 pure $H_2$ can be recovered from $H_2$-hydrocarbon gas streams with high recovery and good bed capacity using activated carbon. The process is a two bed heatless fractionation wherein the actual low pressure purge volume per cycle slightly exceeds the actual high pressure feed volume per cycle. In order to make pure frontal component(s) for external use, the High/Low pressure ratio between the adsorption/desorption cycles must exceed the reciprocal of the mol ratio (X) of the desired component(s) in the feed. Bed lengths are such that no channeling occurs.

Maximum recovery of the component(s)

$$= 1 - \frac{1/X}{P_{High}/P_{low}}$$

Individual feed and dump valves for each bed provides repressure before dump, for continuity of product. Repressure with pure product components is desirable. This reduces the space velocity of feed. A valve is positioned in product line to do this automatically. Also the product surge tank improves product recovery. Furthermore a relief valve in the purge line conserves product need for purge, and also increases recovery.

In accordance with a specific adaptation of the present invention the tail gas is pressure cycled as hereinbefore described to produce relatively pure hydrogen particularly in hydrocarbon mixtures containing the same. The operation can be conducted in the presence of heavy hydrocarbon vapors as for example toluene and the like. Also in accordance with the present invention the amount of actual backwash volume must exceed slightly the actual feed volume per cycle for complete backwash of the least adsorbed component. This determines the minimum pressure reduction for perfect product quality. This may be illustrated by the following examples.

Example 1: Air contains about 20% oxygen. Thus, if five volumes of air are flowed into a bed at high pressure and four volumes of nitrogen are held up by adsorption on molecular sieves, one volume of $O_2$ comes out. If this one volume of $O_2$ is expanded five times, this is just enough volume to sweep all the adsorbed $N_2$ out of the bed during the desorption at low pressure. At a 5:1 pressure ratio there will be 100% pure oxygen coming out at high pressure, but it will all be needed to backwash the bed. This condition is called zero $O_2$ recovery. If the pressure ratio used is 10:1, then one-half of the oxygen will be available for external use. This condition is called 50% $O_2$ recovery. The other half, expanded ten times, will provide the five volumes needed to backwash the adsorbed $N_2$ at the low pressure.

Example 2: Argon exists in air at 0.94 mol. percent mol. fraction 1:106. Molecular sieves 5A, 10X or 13X used in a heatless fractionation apparatus with a pressure ratio exceeding 106:1 should produce pure argon for external use. The discovery and verification of the "1 to 1 rule" has opened up many new and useful possibilities for the separation of light gases by heatless fractionation over solid adsorbents.

The operating process principles of the present invention may be illustrated by the following.

Let $X$ = mol. fraction of $H_2$ in feed (mol. percent)

(100)

$(1-X)$ = mol. fraction of $CH_4$ + other components
$F$ = s.c.f/cycle of mixed feed. Referred to $P_0$, a standard absolute pressure, and $T_0$, the ambient temperature of apparatus.
$R$ = s.c.f./cycle of purge flow having the composition of the product (pure $H_2$). Referred to $P_0$, a standard absolute pressure, and $T_0$, the ambient temperature of apparatus.
$P_{High}$ = adsorption pressure absolute
$P_{Low}$ = desorption pressure absolute The heatless fractionation principle for complete purification of a product is that:

| Purge, vol./cycle at low pressure | Equal or is greater than | Feed, vol./cycle at high pressure |
|---|---|---|
| $\dfrac{R}{P_{Low}/P_0}$ | $\geq$ | $\dfrac{FX+(1-X)}{P_{High}/P_0}$ | or $$R \geq F P_{Low}/P_{High}$$

(1)

This defines the minimum purge of pure product needed to sweep back the concentration gradient of adsorbed components the same distance the gradient was swept forward (toward the product end of the bed) during the adsorption cycle. The cycle must be short enough so that the heat of adsorption liberated by the components caught on the bed does not get lost. It must be retained in the bed to provide the heat to desorb them during the purge cycle. The beds must be long enough to make channeling negligible.

When small impurities are being removed completely from a stream, as in the case of water and oil vapor from compressed air, X (air) is very near unity, and $(1-X)$ for the impurities is small. There is very little gas volume removed from the feed as it passes through the bed. The product D (s.c.f./cycle) for external use plus the purge, R, is almost equal to the feed, F. Equation 1 becomes $$\frac{R}{P_{Low}/P_0} \geq \frac{F}{P_{High}/P_0} \geq \frac{R+D}{P_{High}/P_0}$$

or $$R \geq \frac{R+D}{P_{High}/P_{Low}} \quad (2)$$

This Equation 2 is the one used with the heatless dryer. Equation 1 is more general, and it is used where a considerable part of the feed volume disappears into the bed as it flows through it under high pressure.

The demonstration of pure $H_2$ recovery from $H_2+CH_4+$heavy end mixtures, and the verification of Equation 1 are major discoveries of this invention.

The maximum possible recovery for external use of the least adsorbed component ($H_2$) is determined by its concentration in the feed and the pressure ratio used for adsorption/desorption.

$$\text{Max. pure } H_2 \text{ recovery} = \frac{\text{Pure } H_2 \text{ removed as useful product/cycle}}{H_2 \text{ in feed cycle}}$$

$$\text{Max. recovery } H_2 = \frac{FX-R}{FX}$$

From (1)

$$R \geq FP_{Low}/P_{High}$$

$$\text{Max. recovery } H_2 = \frac{FX - FP_{Low}/P_{High}}{FX}$$

$$= 1 - P_{Low}/P_{High} \cdot X \quad (3)$$

As Example Number 3:

Feed = 50–50 mol. percent $H_2$—$CH_4$
$P_{High} = 155$ p.s.i.g. = 170 p.s.i.a.
$P_{Low} = 0$ p.s.i.g. = 14.7 p.s.i.a.
Max. recovery pure $H_2 = 1 - 14.7/170 \times 0.50$
$= 1 - .174 = 0.826$
$= 82.6\%$ Best observed $H_2$ recovery = 70%

Example Number 4: The recovery of pure product is zero when the pressure ratio $P_{High}/P_{Low}$ is equal to the inverse of the mol. ratio of product component in the feed, $1/X = P_{High}/P_{Low}$.

$$\text{Recovery of pure product} = 1 - \frac{1/X}{P_{High}/P_{Low}} = 0$$

This defines the minimum pressure ratio to achieve high purity product separation.

Also the frontal separation of lightly adsorbed components from their successively more adsorbed through the adsorbent bed shows that heatless fractionation can perform any desired split in the sequence. The frontal separation can be stopped just before breakthrough of a particular member of the sequence. Backwashing with some of the product, expanded to a low pressure with volume slightly greater than the actual feed volume, regenerates the bed.

A sample of Powerformer recycle gas was flowed through a 0.05 c.f. bed of activated carbon. The mixture followed a hydrogen flow. Various components broke through the bed in succession at the 50 p.s.i.g. working pressure, as shown in the following table.

| Component | Analysis, Molecular Percent | Appears after outlet flow of— | |
|---|---|---|---|
| | | C.f. O p.s.i.g., 50° F. | Bed volumes @ 50 p.s.i.g., 50°F |
| Hydrogen | 81.1 | | |
| Methane | 6.1 | 4.15 | 17.2 |
| Ethane | 6.0 | 11.85 | 49 |
| Propane | 5.2 | 19.7 | 82 |
| Butanes | 1.4 | 39 | 161 |
| Pentanes | 0.2 | | |

The numbers (c.f. or bed volumes) in the above table represent relative velocities of the fronts of the various components. For example, $H_2$ flows 17.2 times faster than methane, 49 times faster than ethane, etc. Furthermore, methane flows $49/17.2 = 2.85$ times faster than ethane, $82/17.2 = 48$ times faster than propane, etc. These relative velocities depend on the percentage of each component in the feed mixture. Reference II shows an estimate of the holdback ability of activated carbon for these components at other percentages. The frontal separation can be split in heatless fractionation between any two successive components. Thus, for example, the product can be pure $H_2$, $H_2$+methane, $$H_2+\text{methane} \pm \text{ethane}, H_2+C_3+, \text{etc.}$$

when the feed contains these components.

Different adsorbents provide various sequences. For example, acetylene ($AC_2$) is vigorously held back on Fl activated alumina. It arrives between propylene and butanes. By contrast, on activated carbon acetylene is lightly adsorbed, arriving at the head of the $C_2$ group, acetylene, ethylene, ethane. Thus, activated alumina is an excellent adsorbent to use in a heatless fractionation process to remove all acetylene, $H_2O$, $CO_2$, and $C_3+$ from ethylene. Use of molecular sieve 5A, mixed or in separate beds would scrub out the last part per million of oxygen to provide a very high purity ethylene feed for polyethylene manufacture. These impurities are catalyst poisons, even at p.p.m. levels. Heatless fractionation excels in the removal of impurities to produce super pure gases.

A number of additional tests were carried out which are illustrated in the following table.

Pure $H_2$ From $H_2$—$CH_4$ Mixtures by Heatless Fractionation Over High Surface Area (6G—Mfg. by Activated Carbon[3])

| Feed, Mol percent $H_2$ in $CH_4$, 155 p.s.i.g. | Cycle time at high or low pressure, Seconds | Feed, s.c.f./cy. | Dump + purge, s.c.f./cy. | Atmos. purge, s.c.f./cy. | Actual purge, v./v. Feed, v./v. | Dynamic ratio | 99.9 + % $H_2$ product | | | Remarks |
|---|---|---|---|---|---|---|---|---|---|---|
| | | | | | | | s.c.f./cy. | V./v./cy. | Recovery, percent | |
| 50 [1] | 120 | 2.51 | 1.68 | 0.22 | 4.4/4.3 | 1.02 | 0.83 | 16.5 | 68 | New Carbon, 39° F. |
| 75 [2] | 40 | 1.34 | 0.64 | 0.13 | 2.6/2.3 | 1.13 | 0.70 | 13.9 | 70 | Used, 48° F. |
| 50 [2] | 40 | 1.09 | 0.77 | 0.105 | 2.1/1.9 | 1.10 | 0.32 | 6.5 | 59 | Used, 47° F. |
| 50 [2] | 40 | 1.17 | 0.76 | 0.11 | 2.2/2.0 | 1.10 | 0.41 | 8.1 | 70 | With Product Surge Drum, 50° F. |

[1] New carbon immersed in Powerformate, drained, and revived by use with 3080 s.c.f. feed, then mild heat to 220° F. with 660 s.c.f. feed.
[2] With or without saturated toluene vapor in feed, most with.
[3] 550 grams 0.0504 c.f. each bed, repressure with product $H_2$.

From the above data it is evident:
I. Saturated toluene vapor in the feed had no effect on the separation of high purity $H_2$ from $H_2$—$CH_4$ mixtures. Also there was:
  (a) No noticeable change in operation of the heatless fractionator using the carbon which had been immersed in Powerformate and revived to one-half its original capacity by use and mild heat.
  (b) No odor of toluene in pure $H_2$ product.
  (c) Vigorous odor of toluene in dumps and purge gas.
II. A large amount of toluene used in tests, as for example:
  Feed     260 s.c.f. 50-50 $H_2$—$CH_4$ mixture
             445 s.c.f. 75-25 $H_2$—$CH_4$ mixture
  Total feed 705 s.c.f., picked up vapor of 220 liquid cc. of toluene.
III. Absorbent beds (vol. 0.0504 c.f. each) caught and rejected toluene vapor each cycle in the first several inches of the 10 foot beds.

Figure 3:
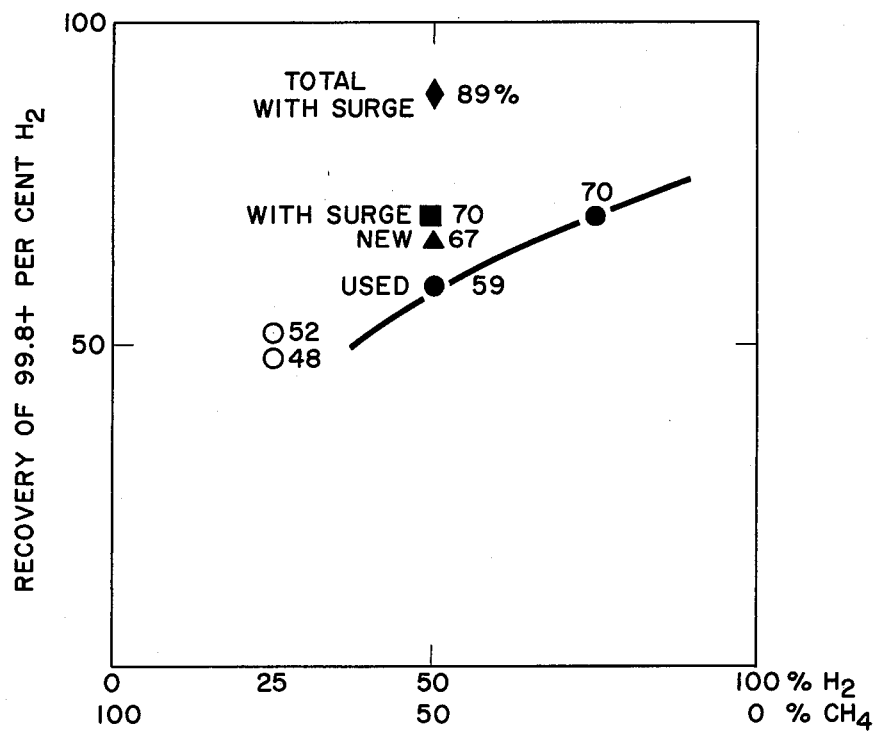

The extent of recovery of pure product hydrogen as compared to hydrogen in the feed is plotted on FIGURE 3.

Additional tests were carried out with the following results.

When Powerformer recycle gas follows a hydrogen flow through an activated carbon bed hydrogen is separated from the mixture.

Various components break through the bed in succession at the 50 p.s.i.g. working pressure:

| Component | Analysis, Molecular percent | Appears after outlet flow of — | |
|---|---|---|---|
| | | C.f. 0, p.s.i.g., 50° F. | Bed volume @ p.s.i.g., 50° F. |
| Hydrogen | 81.1 | | |
| Methane | 6.1 | 4.15 | 17.2 |
| Ethane | 6.0 | 11.85 | 49 |
| Propane | 5.2 | 19.7 | 82 |
| Butanes | 1.4 | 39 | 161 |
| Pentanes | 0.2 | | |

Figure 4:
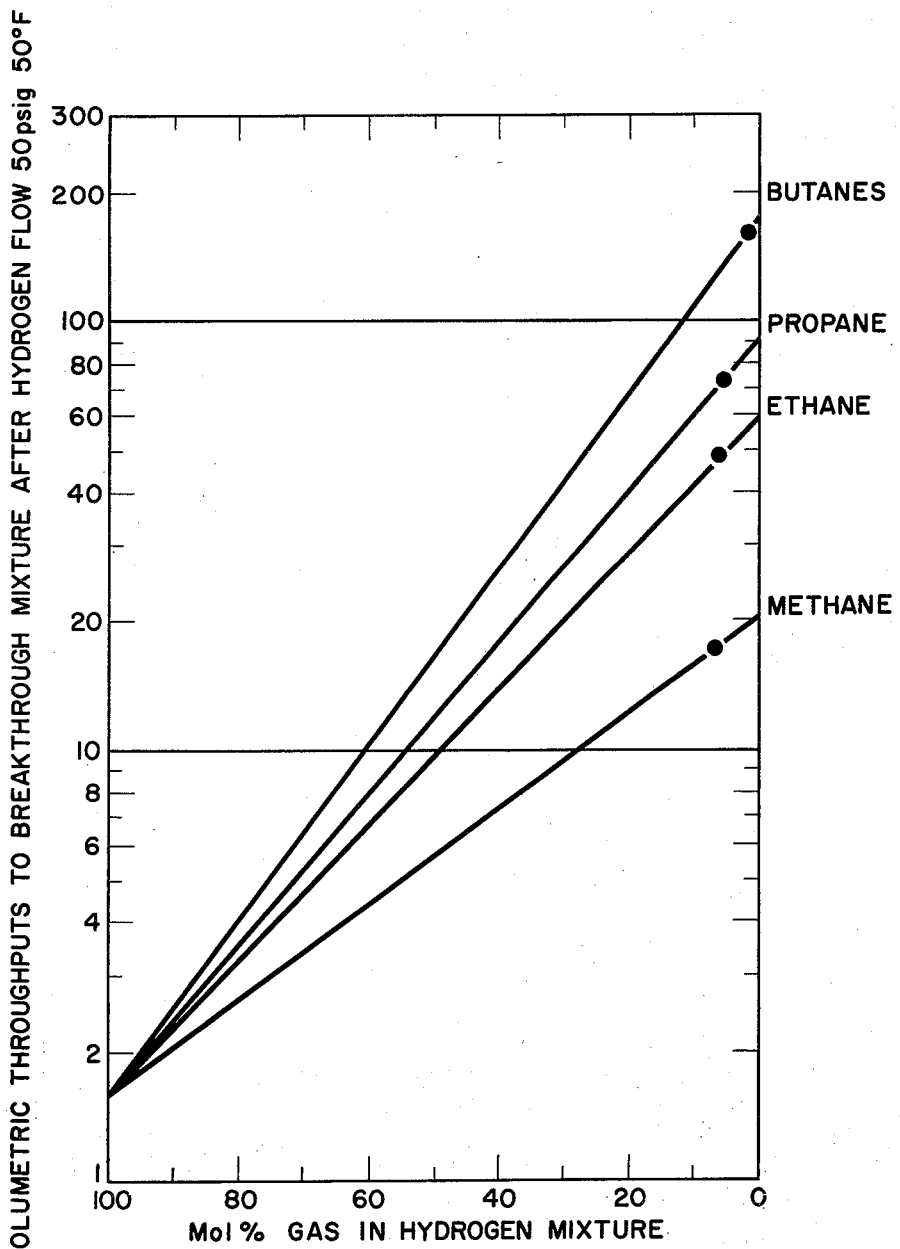

The hold back ability of activated carbon (6G) for these components at other percentages is plotted in FIGURE 4.

Figure 5:
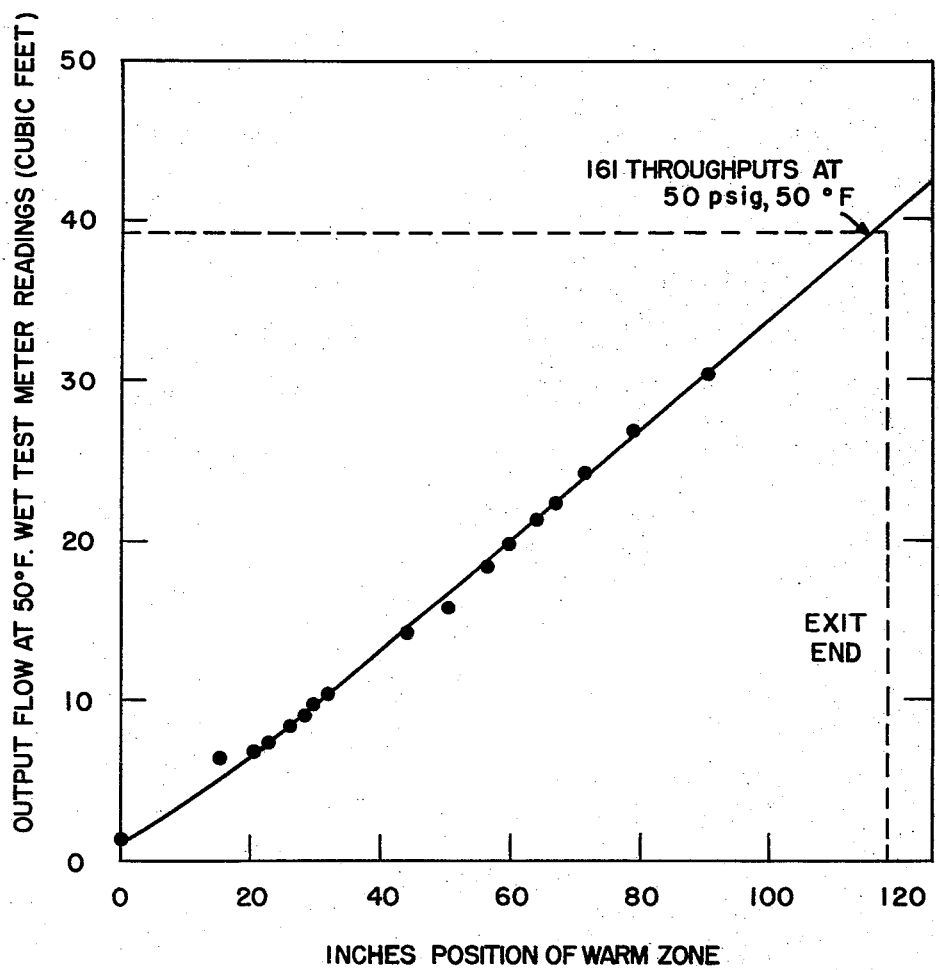

Track was kept of the progress of the butanes front by following the position of a warm zone which moved through the bed. This is shown in FIGURE 5.

The frontal separation of light components from their successively heavier fellow components through the adsorbent bed indicates that heatless fractionation can make any desired split. The frontal separation can be stopped just before breakthrough of a particular member of the sequence. Backwashing at low pressure with some of the product, regenerates the bed.

The "at condition" throughputs shown in the table and FIGURE 4 are really relative velocities of the fronts of the various components. For example: hydrogen flows 17.2 times faster than methane, 49 times faster than ethane, etc., the relative velocities depend on the percentages of the components in the feed mixture. They also depend on the temperature of the bed.

Additional tests were carried out with the following results:

A hydrogen-methane mixture was concentrated from a typical hydroformer recycle gas by heatless fractionation over beds of activated alumina as described hereinbefore. The adsorption pressure was 80 lb./sq. in. gage and the purge pressure approximately atmospheric. Each bed was on the adsorption cycle for one minute, was dumped, backwashed and repressured for about one minute. The ambient temperature was about 50° F., the product rate 0.16 s.c.f.m., purge rate 0.16 s.c.f.m. The analysis of the respective gas streams was as follows:

| | Feed analysis, Molecular percent | Product analysis, Molecular percent |
|---|---|---|
| $H_2$ | 50 | 64.7 |
| Methane | 27 | 34.8 |
| Ethane | 15 | 0.5 |
| Propane | 5 | |
| Butane | 3 | |

From the above it is apparent that the process removed ethane and the higher boiling hydrocarbons substantially completely from the hydrogen methane. In addition the product was dried by the process.

The removal of the water is very important for in a hydroformer or Powerformer process the regeneration or removal of the carbon from the platinum catalyst is secured by controlled burning with oxygen (in inert gas such as nitrogen containing 2–3% of oxygen). After the oxygen has been removed, chlorine is added until chlorine breaks through. It is then necessary to remove residual water which normally is done with hydrogen, since if recycle gas were to be used the ethane tends to crack and redeposits coke. In accordance with the present operation the recycle gas or tail gas is passed through the heatless drier containing alumina or other suitable adsorbents for the removal of the water and ethane and higher boiling constituents. Thus the removal of ethane and higher boiling constituents plus moisture from the Powerformer recycle gas (or other tail gas) with the present process provides a mixture useful in the Powerformer bed regenerations, with a gas produced by the present invention which is readily available.

What is claimed is:

1. A process for the separation of a gas comprising hydrogen from a gaseous mixture stream comprising hydrocarbons, utilizing two adsorbent beds each of which is characterized by having a one end and an other end, said process comprising the steps of flowing a feed stream of gaseous mixture including hydrogen and hydrocarbons from one end to the other end through a first bed of an adsorbent initially relatively free of said hydrocarbons at a preselected initial relatively high pressure and in a positive flow direction in an initial cycle, said adsorbent being preferentially selective for said hydrocarbons; discharging a gaseous stream comprising hydrogen from said first bed as a primary effluent; segregating a portion of said primary effluent as a product stream and withdrawing the same; passing the remainder of said primary effluent in reverse flow from the other end to the one end through a second bed of adsorbent at a relatively low pressure, which adsorbent is relatively saturated with said hydrocarbons as compared to said first bed at the start of said initial cycle, whereby as said initial cycle continues, said first bed becomes relatively saturated with hydrocarbons progressively from said one end toward said other end, and whereby said second bed becomes relatively freed from said hydrocarbons from said other end toward said one end; continuing said initial cycle for a time period less than that required to secure saturation of said first bed at said other end and that required to secure freedom from said hydrocarbons of said second bed at said one end; thereafter introducing said feed stream into said one end of said second bed in positive flow direction at said initial relatively high pressure; discharging a gaseous stream from said other end of said second bed as a primary effluent; segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation wherein per each cycle the volume of said primary effluent passed in reverse flow through said first and through said second bed of adsorbent is greater than the volume of feed passed through each of said beds in said positive flow direction.

2. Process as defined by claim 1 wherein said adsorbent comprises activated carbon.

3. Process as defined by claim 1 wherein said adsorbent comprises activated alumina.

4. A process according to claim 1 wherein, per each cycle, prior to the introduction of feed into said second bed and said first bed, each of said beds are brought up to feed pressure with said primary effluent, and wherein said primary effluent is introduced into said beds in reverse flow with respect to said feed stream.

5. A method according to claim 2 wherein, per each cycle, prior to the introduction of feed into said second bed and said first bed, each of said beds are brought up to feed pressure with said primary effluent, and wherein said primary effluent is introduced into said beds in reverse flow with respect to said feed stream.

6. Process as defined by claim 2 wherein said hydrocarbons comprise $C_1$ to $C_4$ hydrocarbons.

7. Process as defined by claim 6 wherein said primary effluent comprises greater than about 95% hydrogen.

8. A method of fractionating a gaseous mixture of at least two components consisting essentially of the steps of flowing a feed stream of said gaseous mixture comprising hydrogen and hydrocarbons at a preselected initial relatively high pressure and in an initial positive flow direction through a fixed bed of an adsorbent, selective for at least one hydrocarbon of said mixture, for a first cycle time period less than required for said bed to come to equilibrium with said hydrocarbon, discharging the unadsorbed portion of said feed stream as a primary effluent stream comprising hydrogen; interrupting flow of said feed stream at the end of said first cycle period and reducing said initial pressure on said bed at the inlet end, desorbing said hydrocarbon from said bed at a reduced pressure, and discharging said desorbed hydrocarbon from said bed in a flow direction opposite to that of said feed stream of gaseous material, for a second cycle time period, during said second time period flowing at least a portion of a primary effluent stream through said bed in the flow direction of said desorbed hydrocarbon and discharging a portion of said primary effluent portion from said bed together with said desorbed hydrocarbons as a secondary effluent stream; said time periods being each of such short duration that the heats of adsorption and desorption are substantially balanced within said bed and that substantially the sole transfer of heat to and from the gas occurs in said bed, thereby eliminating the need for the transfer of heat externally with respect to said bed; adjusting said cycle periods for a duration adapted to develop an oscillating concentration gradient of said component in said bed which remains in the bed during both the adsorption and desorption cycle, and imparting oscillatory movement to said front substantially within the limits of said bed wherein per each cycle the volume of said primary effluent passed in reverse flow through said first and through said second bed of adsorbent is greater than the volume of feed passed through each of said beds in said positive flow direction.

9. Process as defined by claim 8 wherein said adsorbent comprises activated carbon.

10. Process as defined by claim 8 wherein said adsorbent comprises activated alumina.

11. A method according to claim 8 wherein, per each cycle, prior to the introduction of feed into said bed, said bed is brought up to feed pressure with said primary effluent per each cycle, and wherein said primary effluent is introduced into said bed in reverse flow with respect to said feed stream.

12. Process as defined by claim 9 wherein said hydrocarbon comprises ethane.

13. Process as defined by claim 9 wherein said hydrocarbon comprises methane.

14. A process for the separation of a gas comprising hydrogen from a gaseous mixture stream comprising hydrocarbons, utilizing two adsorbent beds each of which is characterized by having a one end and an other end said process comprising the steps of flowing a feed stream of gaseous mixture including hydrogen and hydrocarbons from one end to the other end through a first bed of an adsorbent initially relatively free of said hydrocarbons at a preselected initial relatively high pressure and in a positive flow direction in an initial cycle, said adsorbent being preferentially selective for said hydrocarbons; discharging a gaseous stream comprising hydrogen from said first bed as a primary effluent; segregating a portion of said primary effluent as a product stream and withdrawing the same; passing the remainder of said primary effluent in reverse flow from the other end to the one end through a second bed of adsorbent at a relatively low pressure, which absorbent is relatively saturated with said hydrocarbons as compared to said first bed at the start of said initial cycle, whereby as said initial cycle continues, said first bed becomes relatively saturated with hydrocarbons progressively from said one end toward said other end, and whereby said second bed becomes relatively freed from said hydrocarbons from said other end toward said one end; continuing said initial cycle for a time period less than that required to secure saturation of said first bed at said other end and that required to secure freedom from said hydrocarbons of said second bed at said one end; thereafter introducing said feed stream into said one end of said second bed in positive flow direction at said initial relatively high pressure; discharging a gaseous stream from said other end of said second bed as a primary effluent, segregating a portion of said last named primary effluent as a product stream and withdrawing the same; passing the remainder of said last named primary effluent in reverse flow from said other end to said one end through said first bed of adsorbent at said relatively low pressure, and thereafter cyclically continuing the operation, wherein per each cycle the volume of said primary effluent passed in reverse flow through said first and through said second bed of adsorbent is greater than the volume of feed passed through each of said beds in said positive flow direction, and wherein said cycles are of such short duration that the heats of adsorption and desorption are substantially balanced within said bed and that substantially the sole transfer of heat to and from the gas occurs in said bed, thereby eliminating the need for the transfer of heat externally with respect to said bed.

15. A process according to claim 14 wherein, per each cycle prior to the introduction of feed into said second bed in said first bed, each of said beds is brought up to feed pressure with said primary effluent, and wherein said primary effluent is introduced into said beds in reverse flow with respect to said feed stream.

References Cited in the file of this patent
UNITED STATES PATENTS

| | | |
|---|---|---|
| 2,519,873 | Berg | Aug. 22, 1950 |
| 2,818,455 | Ballard et al. | Dec. 31, 1957 |
| 2,944,627 | Skarstrom | July 12, 1960 |

OTHER REFERENCES

"Adsorption," by C. L. Mantell, First Ed., McGraw-Hill Book Co., N.Y., 1945, page 12.